Oct. 19, 1965  A. J. HILDENBRANDT  3,212,712
THERMOSTATIC CONTROL MEANS FOR GAS BURNERS
Original Filed June 25, 1962  2 Sheets-Sheet 1
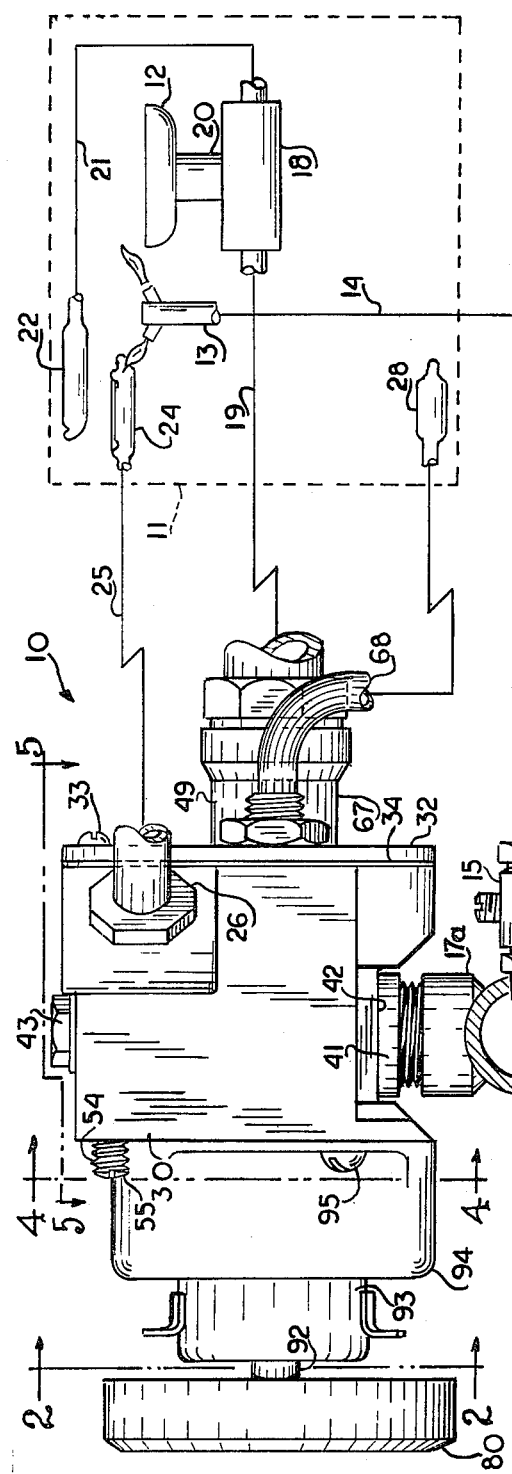
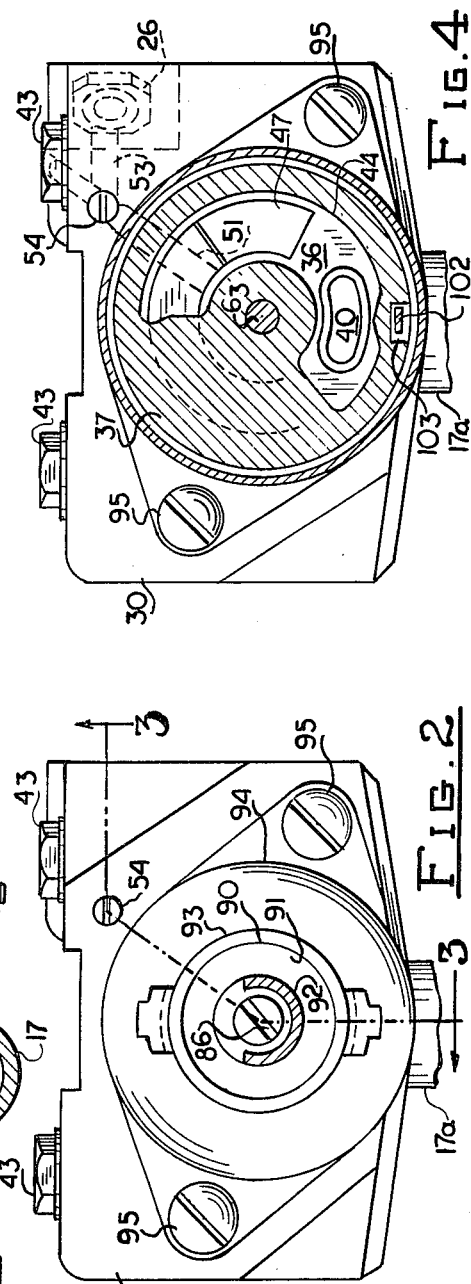
INVENTOR
AUGUST J. HILDENBRANDT.
BY
ATTORNEY

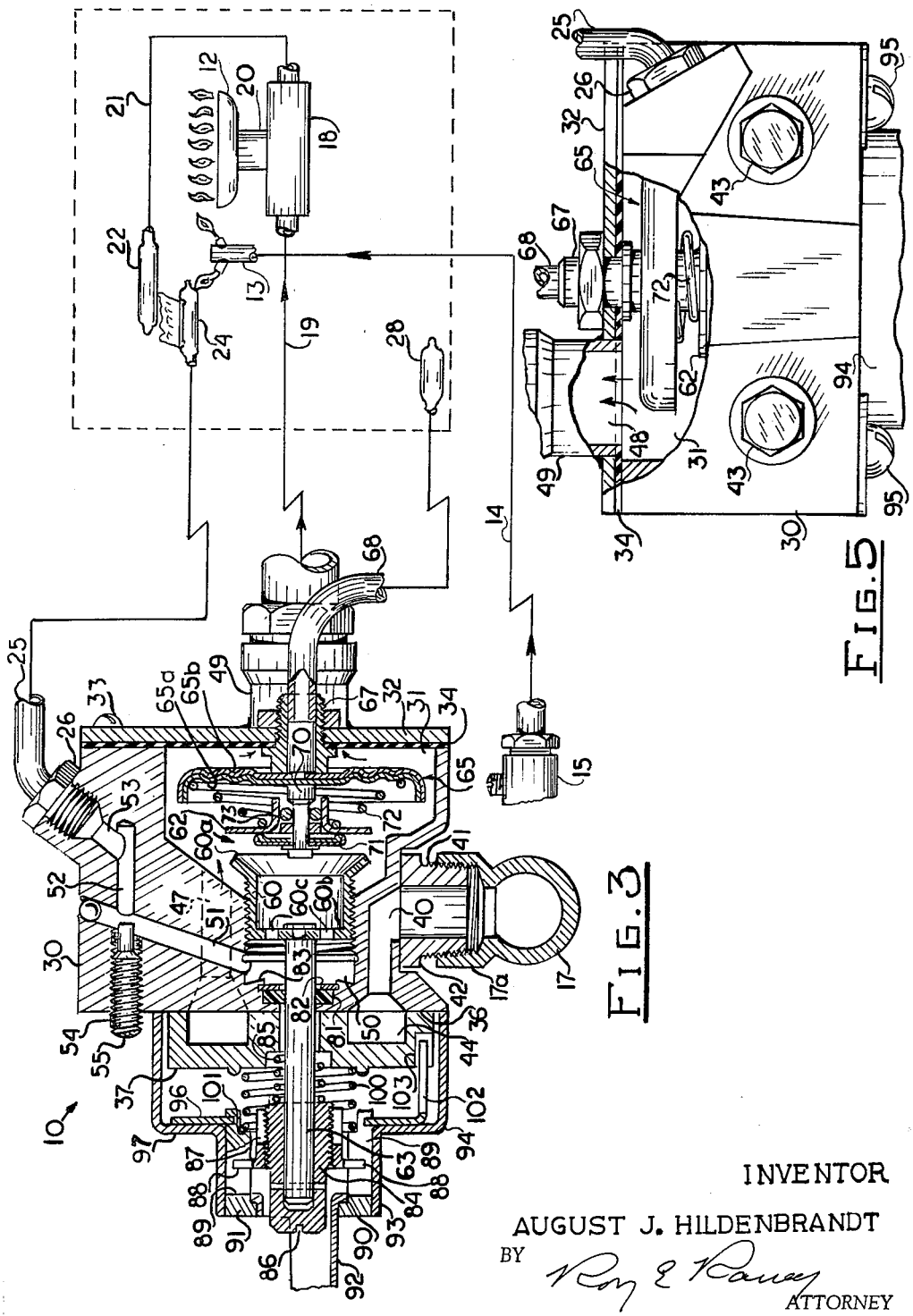

United States Patent Office 3,212,712
Patented Oct. 19, 1965

3,212,712
THERMOSTATIC CONTROL MEANS FOR
GAS BURNERS
August J. Hildenbrandt, Scotch Plains, N.J., assignor to
The Wilcolator Company, Elizabeth, N.J., a corporation of Delaware
Continuation of abandoned application Ser. No. 204,740,
June 25, 1962. This application July 24, 1964, Ser. No.
387,267
2 Claims. (Cl. 236—99)

This application is a continuation of my application Serial Number 204,740 filed June 25, 1962, now abandoned.

This invention relates generally to thermostatic regulation of the flow of fuel gas to burners of ovens, cooking ranges and the like, by burner control systems of the type including a thermally actuated cycling valve for operating the burner in an "off" and "on" manner to maintain a selected temperature. More particularly, the invention is directed to improvements in a temperature selecting control valve means which permits unrestricted flow of fuel gas to the cycling valve during normal operation and yet permits the gas supply to be shut off in the usual manner in the event of failure of the thermostatic or cycling valves.

In some burner cycling systems the cycling valves is connected directly between the gas source and the main burner and is actuated between opened and closing positions in response to presence or absence of a flame at a control pilot burner which is thermostatically controlled in accordance with the oven or stove temperature by a manually adjustable thermostatic control valve. This form of control is considered dangerous in that, in the event of failure of the cycling valve to close, or in the event of failure of the thermostatic portion of the control valve, the supply of gas to the burner cannot be shut off in the usual way by turning the thermostatic control valve knob to the "off" position.

In other burner cycling systems it has been the practice to avoid this danger by causing the gas to flow in series from the supply through an "on-off" valve, then through a thermostatic valve to both the main burner cycling valve and the control pilot burner. Because the gas flowing to the main burner must first pass through the thermostatic valve, a relatively large thermostatic valve is required and the flow of gas to the main burner is diminished as the oven or range approaches the selected temperature.

With the foregoing in mind, it is a principal object of this invention to provide a novel burner cycling system and control valve device which overcomes all of the foregoing disadvantages in a particularly simple yet reliable manner.

Another object of this invention is the provision of an improved control valve device for use in a system including a cycling valve for controlling the flow of gas to a main burner in response to presence or absence of a flame at a control burner, the improved control valve device having a manually operated shut-off valve, disposed between the source and the cycling valve, and a manually adjustable thermostatic valve for controlling a flow of gas from the shut-off valve to the control pilot burner without affecting the flow of gas to the cycling valve, yet permitting manual operation of the shut-off valve in the usual way to interrupt all gas flow in the event of a failure in any part of the system.

As another object this invention aims to provide an improved control valve device of the foregoing character wherein all of the gas passes through a manually positionable "on-off" or shut-off valve, but only the gas to the control pilot burner passes through the thermostatic valve, whereby a relatively small, efficient thermostatic valve may be employed resulting in a particularly compact, reliable, and safe valve device.

Still another object of this invention is the provision of a control valve device comprising a body including a chamber having an inlet passage controlled by a manually positionable valve member, a first outlet passage for connection with a main burner through a cycling valve, and a second outlet passage controlled by thermostatic valve means for regulating gas flow to a control pilot for actuating the cycling valve, and a single manually operable means for positioning the valve member and adjusting the thermostatic valve means.

Other objects and advantages of this invention will become apparent from the following detailed description of a preferred example of a burner cycling system and control valve means embodying the invention read in conjunction with the accompanying sheets of drawings forming a part of this specification, and in which:

FIG. 1 is a side elevational view of a control valve device embodying this invention as part of a schematically illustrated gas burner control system;

FIG. 2 is a front view of the control valve device taken along line 2—2 of FIG. 1;

FIG. 3 is a longitudinal sectional view of the control valve device taken substantially along line 3—3 of FIG. 2 and illustrated as part of the control system of FIG. 1;

FIG. 4 is a sectional view taken along line 4—4 of FIG. 1; and

FIG. 5 is a fragmentary top view taken along line 5—5 of FIG. 1 with a portion broken away.

Although burner control systems and control valves embodying this invention may be utilized for controlling gas flow to top burners of domestic ranges, kilns, and the like, the invention will be described hereinafter with reference to use in the baking oven of a domestic stove.

Referring to FIG. 1, a control valve, generally indicated at 10, forms part of a gas heating system for an oven 11 which is shown schematically and may be of any conventional construction, the heating system including a main oven burner 12 arranged to be ignited by a standby pilot burner 13. Pilot burner 13 is provided with a constant supply of fuel through pipe 14 which is connected through a screw adjustment valve 15 to a gas manifold 17 forming part of the oven and which arrangement is well known in the art. Oven burner 12 is supplied with a flow of fuel from the manifold 17 through the control valve 10 and a thermally actuated cycling valve 18 which is connected between valve 10 and burner 12 by suitable pipes 19 and 20, respectively. The control valve 10, together with the cycling valve 18, controls the flow of gas to the oven burner 12 in a manner described more fully hereinafter.

The cycling valve 18, which is adapted to interrupt the flow of gas to burner 12, may be of any convenient construction well known in the art but is preferably of the type disclosed in now abandoned patent application Ser. No. 109,035, filed May 10, 1961, and assigned to the assignee of this application, and to which reference may be had for a more complete description. Suffice it to say, however, that the cycling valve 18 is of the quick opening and closing type and is connected by a capillary tube 21 to a temperature sensing bulb 22 which is disposed over a control burner 24. The bulb 22 and tube 21 contain an expansible fluid and communicate with an expansible, valve operating power member (not shown) for opening and closing the valve 18 in accordance with the presence or absence, respectively, of a flame at the control pilot burner 24. The control pilot burner 24 is connected by a supply pipe 25 to an outlet connection 26 of the valve device 10 which supplies gas to the burner pilot in accordance with oven temperatures sensed by a temperature sensing bulb 28 in a manner which will become apparent as the description proceeds.

Referring more particularly now to FIG. 3, valve 10 comprises a valve body 30, preferably formed of aluminum or other suitable metal, and having a generally conical shaped recess 31 formed therein, the larger end of which is closed by a cover member 32 secured to body 30 by screws 33 with a suitable gasket 34 interposed therebetween. The end of body 30 opposite cover member 32 is provided with a flat smooth face 36 which serves as a seat for a rotatable valve disc 37 which is arranged to rotate relative to face 36 while maintaining a gas tight seal with the areas engaged thereby. Body 30 is provided with a gas inlet passage 40, the outer end of which is connected with an internally threaded boss 17a of manifold 17 by a nipple 41 having a flange 42 secured to the valve body 30 as by screws 43, and the inner end of which passage opens in face 36. The valve disc 37 is provided with an arcuate recess 44 facing surface 36 and, as may be seen in FIG. 4, this recess subtends an angle of about 235°. The valve disc 37 is illustrated in FIGS. 3 and 4 in an "on" condition in which the recess 44 overlies the inner end of inlet passage 40 and also overlies one end of an arcuate passage 47 leading from surface 36 directly into the chamber formed by recess 31 and cover member 32. The cover member 32 is provided with an outlet passage 48 through an outlet connection 49 which is connected to pipe 19 leading to the cycling valve 18.

A threaded bore 50 is formed in the valve body 30 at the inner, or smaller end of recess 31 and a control pilot burner gas flow passage 51 leads from the threaded bore through drilled passage ways 52 and 53 to the outlet connection 26 which is connected to the control pilot burner supply line 25.

Gas passes from the recess or chamber 31 into the threaded bore 50 under the control of a thermostatically operated valve means, described more fully hereinafter, for exit through passages 51, 52, 53, and supply line 25 to the control pilot burner. A needle valve member 54 having a screw driver slot 55 is threadedly engaged in passage 52 and is adapted to be adjusted to vary the flow path at the junction of passages 51 and 52 to regulate the maximum flame height at the control pilot burner 24.

The mentioned thermostatically operated valve means comprises a cup-shaped valve seat member 60 threaded into threaded bore 50 and having a flaring end opening into the chamber formed by recess 31 to provide an annular valve seat 60a. The valve seat member 60 has an end wall 60b provided with openings 60c through which gas passes into the threaded bore 50. The seat member 60 can be rotated in the threaded bore 50 varying its position relative to a thermostatically positioned valve member 62, described more fully hereinafter, by a shaft 63 connected to the end wall 60b of the valve seat member as shown.

An expansible wafer 65 is mounted on cover member 32 and preferably comprises two nested corrugated flexible discs 65a and 65b welded together about their rims to form an expansible chamber containing a relatively small volume of an expansible fluid. The disc 65b is secured to a nipple 67 mounted in an opening in cover member 32 and having a passage communicating with the interior of the wafer 65. A capillary tube 68 has one end brazed in the nipple 67 and has its other end communicating with the interior of the temperature sensing bulb 28 located in the oven 11. The wafer 65, tube 68, and bulb 28 are filled with a suitable fluid, preferably liquid, which expands and contracts upon increases and decreases in temperature to cause corresponding expansion and contraction of the wafer 65 in a manner which is well understood in the art.

The disc 64a is provided with a stem 70 on which is mounted the disc-like valve member 62 which is adapted to be moved toward and away from seat 60a by expansion and contraction of the expansible wafer 65 in response to temperature changes sensed by bulb 28. The valve member 62 is preferably mounted on stem 70 between a bimetallic washer 71 and a spring 72 which permits limited movement of the valve member with respect to the stem to assure proper alignment thereof with the valve seat 60a. The bimetallic washer is adapted to flex in response to changes in temperature to vary the position of the valve member along the stem 70 in compensation for changes in volume of the liquid inside the wafer 65 due to temperature changes inside the valve body. A resilient O-ring 73 provides a seal between the valve member 62 and the stem 70.

It will be appreciated that the flow of gas from the recess 31 through the thermostatic valve means to the control pilot burner 24 will be dependent upon the temperature of the oven experienced by the sensing bulb 28 and by the positioning of the valve seat member 60 axially of the threaded bore 50. It will also be appreciated that the valve member 37 provides an "on-off" control of the flow of gas from the manifold 17 to both the main burner 12 through the cycling valve 18 and the control pilot burner 24 through the thermostatic control valve means.

Because of the length of the arcuate recess 44, the valve member 37 may be rotated through approximately 200° of angular movement while in a full "on" condition. This range of movement permits the shaft 63 and valve seat member 60 to be rotated to position the latter axially of threaded bore 50 to select a desired oven operating temperature while effecting simultaneous rotation of the valve member 37 from an "off" position to an "on" position by means of a single, manually operated knob 80.

Knob 80 is drivingly connected to both the valve member 37 and the shaft 63 in such a manner that both are normally operated simultaneously, yet the shaft 63 may be rotated independently by a service man for calibrating the valve device. To this end, the inner end of the shaft 63 is supported for axial and rotatable movements by a packing washer 81 secured in a recess at the bottom of the threaded bore 50 by a washer 82 held in place by a rolled-over lip 83. The intermediate portion of shaft 63 extends freely through a central opening in the valve disc 37, and the outer end is pinned in an externally threaded bushing 84 for rotation therewith. A compression spring 85 is disposed between the valve member 37 and the bushing 84 and acts to hold the valve member against face 36 and to provide a drag against rotation of the valve seat member 60 in the threaded bore 50. The bushing 84 has a stem portion provided with a screw driver slot 86 which permits rotation of the shaft 63 for calibration purposes, and the bushing is threaded in a sleeve 87 having diametrically extending ears 88. The threaded sleeve 87 is slotted to form fingers having an inward set for resiliently gripping the bushing 84. The ears 88 are engaged in axially extending, opposed slots 89 in the side walls of a cup-shaped drive member 90 which has an end wall 91 having a central opening in which is secured a semi-cylindrical shaft 92 through which is exposed the screw driver slot 86 on the stem portion of the bushing 84.

The drive member 90 is rotatably supported in a sleeve portion 93 of an annular cover member 94 which is secured by screws 95 to the valve body 30. The drive member 90 comprises a radially extending flange 96 disposed against the inside surface of a shoulder portion 97 of cover 94 and is biased outwardly by a spring 100 acting between the valve member 37 and an inner shoulder 101 of the drive member. A drive lug 102 extends from the outer edge of flange 96 into engagement with a notch 103 formed in the periphery of valve member 37 and causes the latter to be rotated with the drive member. The sleeve 87 also is rotated by the ears 88 in engagement with the drive member 90 and frictionally grips the bushing 84 so as to effect rotation of the shaft 63. Thus, the knob may be rotated to bring the recess of valve member 37 into registration with both the inlet passages 40 and 47 so as to admit a supply of gas to the recess 31, and to axially position the valve seat member 60 to select a temperature which will be maintained in the oven 11.

Assuming the oven 11 to be cold and the knob to have been rotated in the just mentioned manner to turn on the gas supply and to select a temperature to be maintained in the oven, gas will immediately flow through the outlet connection 49 to the cycling valve 18 which is in a closed condition. Gas will also flow through the thermostatic valve seat member 60 through passages 51, 52, and 53 through supply line 25 to the pilot burner 24 which is thereupon ignited by the standby pilot 13. The flame of the control pilot burner 24 plays upon the temperature sensing bulb 22 connected by capillary tube 21 to the cycling valve 18, causing the latter to quickly open and admit a flow of gas to the main burner 12 which is thereupon ignited by the standby pilot burner 13.

The main burner 12 continues to burn until the temperature in the oven 11 rises to the preselected temperature, at which time the liquid in the temperature sensing bulb 23 expands sufficiently to distend the wafer 65 and seat the valve member 62 against the annular seat 60a. The supply of gas to the control pilot burner is thereby cut off, causing the control pilot burner 24 to be extinguished, the bulb 22 to cool, and the cycling valve 18 to quickly close. The closing of valve 18 extinguishes the main burner 12, whereupon the oven temperature begins to recede.

As the oven temperature recedes, the corresponding contraction of the liquid in bulb 28 results in contraction of the wafer 65 and movement of the thermostatic valve member 62 away from its seat 60a. Gas again flows through the now open thermostatic valve member to the control pilot burner 24 which is re-ignited by the standby pilot 13 so as to heat bulb 22 and cause opening of cycling valve 18 and re-ignition of the main burner 12. The foregoing sequence of events is repeated, with the main burner being cycled between "on" and "off" conditions in accordance with the presence or absence of a flame at the control pilot burner 24 as regulated by the thermostatic valve.

From the foregoing detailed description of a burner cycling system and control valve means embodying this invention, it will be appreciated that there has been provided thereby a novel valve means which permits the supply of gas to the main burner and control pilot burner to be shut off, in the event of cycling or thermostatic valve failure, by merely turning the control knob to its "off" position in the usual manner. It will also be appreciated that only the gas flowing to the control pilot burner is passed through the thermostatic valve means so that a small and reliable thermostatic valve means may be utilized without affecting the gas supply to the main burner.

Although the invention has been described with detailed reference to a specific burner cycling system and control valve means embodying the invention, it will be understood that the invention is not limited thereto, but rather the invention includes all those changes, modifications, substitutions, and uses as are reasonably embraced by the scope of the claims hereof.

Having described my invention, I claim:

1. In a thermostatic valve for controlling the flow of gas to a burner, a valve body with walls forming a chamber therein, one end wall of said chamber having an opening therethrough, a thermostatically operated valve closure member in said chamber, a rotatable shaft closed to flow of gas therethrough and projecting through said opening in said end wall and extending into said chamber, sealing means forming a gas tight seal between the edges of said opening through said one wall of said chamber and said shaft, said one wall having a recess therein providing a gas passage, one end of said recess being closed by said sealing means and the portion of said one wall surrounding said shaft, valve seat means at the other end of said recess forming a valve seat for said valve closure member, means connected with said shaft for adjusting thermostatic operation of said valve closure member relative to its seat upon rotation of said shaft, said end wall of said chamber having a relatively small volume gas passage leading from adjacent said one end of said recess to the exterior of said body, said end wall of said chamber having a main flow passage therethrough of substantially greater volume capacity than said small volume gas passage and leading from the outer surface of said end wall into said chamber, another wall of said chamber having a flow passage therethrough of substantially the same flow capacity as that of said main flow passage leading from the interior of said chamber to the exterior thereof for supplying gas to a burner, and a valve member on the exterior of said end wall and attached to said rotatable shaft and rotatable thereby to move relative to the opening of said first mentioned relatively large volume flow passage in said outer surface of said one end wall to control the flow of gas therethrough.

2. In a thermostatic valve for controlling the flow of gas to a burner, a valve body with walls forming a chamber therein, one end wall of said chamber having an opening therethrough, a thermostatically operated valve closure member in said chamber, a rotatable shaft closed to the flow of gas therethrough and projecting through said opening in said end wall and extending into said chamber, sealing means forming a gas tight seal between the edges of said opening through said one wall of said chamber and said shaft, said one wall having a recess therein open at one end to the interior of said chamber and the other end of said recess being closed by said shaft and said sealing means, a cylindrical valve seat member threaded into said open end of said recess and the outer end thereof forming a valve seat for said valve closure member, means forming a driving connection between said shaft and said valve seat member for adjusting the position of said valve seat relative to said valve closure member by rotation of said shaft, one end wall of said chamber having a relatively small volume gas passage leading from adjacent said other end of said recess and inwardly beyond the inner end of said valve seat member to the exterior of said body, said end wall of said chamber having a main flow passage therethrough of substantially greater capacity than said small volme gas passage and leading from the outer surface of said end wall into said chamber, another wall of said chamber having a gas flow passage therethrough and having a capacity substantially equal to that of said main flow passage and leading from the interior of said chamber to the exterior thereof, and a valve member on the exterior of said end wall and attached to said rotatable shaft and rotatable thereby to move relative to the opening of said first mentioned relatively large volume flow passage in said outer surface of said end wall to control the flow of gas therethrough.

References Cited by the Examiner

UNITED STATES PATENTS

| 1,842,335 | 1/32 | Te Pas | 236—68 |
| 2,153,886 | 4/39 | Grayson | 236—15 |
| 3,065,913 | 11/62 | Holzboog et al. | 236—68 |

FOREIGN PATENTS

| 803,132 | 9/36 | France. | |

EDWARD J. MICHAEL, *Primary Examiner.*

ALDEN D. STEWART, *Examiner.*